US008327173B2

(12) United States Patent
Hendin et al.

(10) Patent No.: US 8,327,173 B2
(45) Date of Patent: Dec. 4, 2012

(54) INTEGRATED CIRCUIT DEVICE CORE POWER DOWN INDEPENDENT OF PERIPHERAL DEVICE OPERATION

(75) Inventors: Neil Hendin, Mountain View, CA (US); Zahid Najam, San Jose, CA (US); Stephane Le Provost, San Jose, CA (US); Brian Smith, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 652 days.

(21) Appl. No.: 12/002,711

(22) Filed: Dec. 17, 2007

(65) Prior Publication Data
US 2009/0153211 A1 Jun. 18, 2009

(51) Int. Cl.
*G06F 1/00* (2006.01)
(52) U.S. Cl. ...................................................... 713/323
(58) Field of Classification Search .................. 710/305; 713/300–340
See application file for complete search history.

(56) References Cited

U.S. PATENT DOCUMENTS

| | | | |
|---|---|---|---|
| 4,868,832 A | 9/1989 | Marrington et al. | |
| 5,109,494 A * | 4/1992 | Ehlig et al. ..................... | 710/305 |
| 5,142,690 A | 8/1992 | McMullan, Jr. et al. | |
| 5,220,660 A | 6/1993 | Yoshizawa et al. | |
| 5,230,067 A * | 7/1993 | Buch ............................ | 710/107 |
| 5,274,828 A | 12/1993 | McAdams | |
| 5,305,443 A * | 4/1994 | Franzo ........................... | 710/110 |
| 5,339,445 A | 8/1994 | Gasztonyi | |
| 5,386,552 A | 1/1995 | Garney | |
| 5,388,265 A | 2/1995 | Volk | |
| 5,396,635 A | 3/1995 | Fung | |
| 5,402,492 A | 3/1995 | Goodman et al. | |
| 5,408,668 A * | 4/1995 | Tornai ........................... | 713/324 |
| 5,446,904 A | 8/1995 | Belt et al. | |
| 5,471,189 A | 11/1995 | Dietz et al. | |
| 5,510,740 A | 4/1996 | Farrell et al. | |
| 5,517,441 A | 5/1996 | Dietz et al. | |
| 5,524,249 A | 6/1996 | Suboh | |

(Continued)

FOREIGN PATENT DOCUMENTS

GB 2457170 8/2009
(Continued)

OTHER PUBLICATIONS

"About Viewlink CSS Inheritance," http://msdn.microsoft.com/workshop/author/behaviors/overview/viewlink_ovw_css.asp, pp. 1-3, Dec. 17, 2002.

(Continued)

*Primary Examiner* — Paul R Myers

(57) ABSTRACT

In an integrated circuit device, a circuit for maintaining asserted values on an input output pin of the device when a functional block of the device is placed in a sleep mode. The circuit includes an interface for coupling a functional block of a processor to an input and output pin and an output storage element coupled to the interface for storing a current value of the input output pin. The circuit further includes a sleep mode enable for controlling the output storage element to store the current value of the input output pin prior to the functional block being entering a sleep mode and cause the current value of the input output pin to remain asserted after the functional block is in sleep mode. The sleep mode enable is also to deactivate the storage element when the sleep mode is exited.

18 Claims, 5 Drawing Sheets

U.S. PATENT DOCUMENTS

| | | | |
|---|---|---|---|
| 5,528,610 A * | 6/1996 | Edler et al. | 714/727 |
| 5,530,845 A | 6/1996 | Hiatt et al. | |
| 5,535,398 A * | 7/1996 | Biggs et al. | 713/324 |
| 5,557,777 A | 9/1996 | Culbert | |
| 5,586,308 A | 12/1996 | Hawkins et al. | |
| 5,588,099 A | 12/1996 | Mogilevsky et al. | |
| 5,594,367 A * | 1/1997 | Trimberger et al. | 326/41 |
| 5,594,874 A * | 1/1997 | Narayanan et al. | 710/104 |
| 5,649,222 A | 7/1997 | Mogilevsky | |
| 5,659,687 A | 8/1997 | Kim et al. | |
| 5,687,382 A | 11/1997 | Kojima et al. | |
| 5,737,613 A | 4/1998 | Mensch, Jr. | |
| 5,752,050 A | 5/1998 | Hernandez et al. | |
| 5,758,133 A | 5/1998 | Envoy | |
| 5,790,877 A | 8/1998 | Nishiyama et al. | |
| 5,862,368 A | 1/1999 | Miller et al. | |
| 5,869,979 A * | 2/1999 | Bocchino | 326/38 |
| 5,898,879 A | 4/1999 | Kim | |
| 5,951,689 A | 9/1999 | Evoy et al. | |
| 5,963,219 A * | 10/1999 | Choi | 345/501 |
| 6,029,170 A | 2/2000 | Garger et al. | |
| 6,034,544 A * | 3/2000 | Agrawal et al. | 326/39 |
| 6,040,845 A | 3/2000 | Melo et al. | |
| 6,057,705 A * | 5/2000 | Wojewoda et al. | 326/38 |
| 6,061,679 A | 5/2000 | Bournas et al. | |
| 6,134,167 A | 10/2000 | Atkinson | |
| 6,163,583 A | 12/2000 | Lin et al. | |
| 6,169,546 B1 | 1/2001 | Bogdan | |
| 6,169,984 B1 | 1/2001 | Bogdan | |
| 6,178,523 B1 | 1/2001 | Klein | |
| 6,191,969 B1 | 2/2001 | Pereira | |
| 6,191,970 B1 | 2/2001 | Pereira | |
| 6,212,645 B1 | 4/2001 | Tjandrasuwita | |
| 6,216,234 B1 | 4/2001 | Sager et al. | |
| 6,243,280 B1 | 6/2001 | Wong et al. | |
| 6,249,284 B1 | 6/2001 | Bogdan | |
| 6,266,776 B1 | 7/2001 | Sakai | |
| 6,347,370 B1 | 2/2002 | Grimsrud | |
| 6,397,340 B2 | 5/2002 | Watts, Jr. et al. | |
| 6,523,128 B1 | 2/2003 | Stapleton et al. | |
| 6,538,947 B2 | 3/2003 | Ahmed et al. | |
| 6,552,596 B2 | 4/2003 | Cowles et al. | |
| 6,584,003 B1 | 6/2003 | Kim et al. | |
| 6,600,575 B1 | 7/2003 | Kohara | |
| 6,678,831 B1 | 1/2004 | Mustafa et al. | |
| 6,694,451 B2 | 2/2004 | Atkinson | |
| 6,717,435 B1 * | 4/2004 | Mitsumori et al. | 326/38 |
| 6,728,959 B1 | 4/2004 | Merkey | |
| 6,754,837 B1 | 6/2004 | Helms | |
| 6,760,850 B1 | 7/2004 | Atkinson et al. | |
| 6,762,768 B2 | 7/2004 | Dilliplane | |
| 6,765,958 B1 * | 7/2004 | Dowling | 375/232 |
| 6,768,659 B2 | 7/2004 | Gillingham et al. | |
| 6,775,776 B1 | 8/2004 | Vogt et al. | |
| 6,804,267 B1 | 10/2004 | Long et al. | |
| 6,804,763 B1 | 10/2004 | Stockdale et al. | |
| 6,816,809 B2 | 11/2004 | Circenis | |
| 6,845,434 B2 | 1/2005 | Lin | |
| 6,845,456 B1 | 1/2005 | Menezes et al. | |
| 6,901,298 B1 | 5/2005 | Govindaraj et al. | |
| 6,990,594 B2 | 1/2006 | Kim | |
| 7,043,649 B2 | 5/2006 | Terrell, II | |
| 7,058,834 B2 | 6/2006 | Woods et al. | |
| 7,174,472 B2 | 2/2007 | Hill | |
| 7,187,205 B2 | 3/2007 | Ramaraju et al. | |
| 7,243,318 B1 * | 7/2007 | Mirza et al. | 716/4 |
| 7,256,232 B2 | 8/2007 | Lamaze et al. | |
| 7,285,980 B2 * | 10/2007 | Bansal et al. | 326/38 |
| 7,372,298 B2 * | 5/2008 | Chu et al. | 326/38 |
| 7,401,240 B2 | 7/2008 | Heller et al. | |
| 7,426,647 B2 | 9/2008 | Fleck et al. | |
| 7,428,644 B2 | 9/2008 | Jeddeloh et al. | |
| 7,432,921 B2 | 10/2008 | Oshima et al. | |
| 7,434,072 B2 | 10/2008 | Peirson et al. | |
| 7,529,958 B2 | 5/2009 | Roth et al. | |
| 7,583,104 B2 | 9/2009 | Simmons et al. | |
| 7,599,317 B2 * | 10/2009 | Schaap | 370/310 |
| 7,624,215 B2 | 11/2009 | Axford et al. | |
| 7,631,117 B2 * | 12/2009 | Aida et al. | 710/50 |
| 7,698,586 B2 * | 4/2010 | Kim et al. | 713/324 |
| 7,739,533 B2 | 6/2010 | Rauschmayer et al. | |
| 2001/0044909 A1 | 11/2001 | Oh et al. | |
| 2002/0172008 A1 | 11/2002 | Michael | |
| 2003/0023825 A1 | 1/2003 | Woo et al. | |
| 2003/0093702 A1 | 5/2003 | Luo et al. | |
| 2003/0204757 A1 | 10/2003 | Flynn | |
| 2003/0204761 A1 | 10/2003 | D'Alessio | |
| 2003/0206164 A1 | 11/2003 | Juenger | |
| 2003/0233525 A1 | 12/2003 | Reeves | |
| 2004/0128574 A1 | 7/2004 | Ricci et al. | |
| 2004/0224728 A1 * | 11/2004 | Dacosta et al. | 455/574 |
| 2005/0015321 A1 | 1/2005 | Vindekilde | |
| 2005/0125705 A1 | 6/2005 | Cheng et al. | |
| 2006/0184808 A1 | 8/2006 | Chua-Eoan et al. | |
| 2006/0226895 A1 | 10/2006 | Hoshi et al. | |
| 2007/0300092 A1 | 12/2007 | Kurita | |
| 2008/0082847 A1 * | 4/2008 | Lee et al. | 713/323 |

FOREIGN PATENT DOCUMENTS

| | | |
|---|---|---|
| WO | 2004102623 | 11/2004 |

OTHER PUBLICATIONS

"About Viewlink Event Routing," http://msdn.microsoft.com/workshop/author/behaviors/overview/viewlink_ovw_events.asp, pp. 1-3, Dec. 17, 2002.

Application As Filed; U.S. Appl. No. 12/101,028; Brian Smith et al., Filed Apr. 10, 2008.

Application As Filed; U.S. Appl. No. 12/101,055; Tom Verveure; Filed Apr. 10, 2008.

Application As Filed; U.S. Appl. No. 12/029,442; Brian Smith et al., Filed Feb. 11, 2008.

IEEE Journal of Solid-State Circuits, vol. 42, No. 1, Jan. 2007.

Application As Filed; U.S. Appl. No. 12/029,404; Brian Smith et al., Filed Feb. 11, 2008.

"Benefits of using ViewLink," http://msdn.microsoft.com/workshop/samples/author/behaviors/overview/vlcomparison.htm, p. 1, Dec. 17, 2002.

Henrich, "A Hybrid Split Strategy for k-d-Tree Based Access Structures," ACM Proceedings of the Fourth ACM Workshop on Advances in Geographic Information Systems, pp. 1-8, 1997.

Khuller et al., "Graph and Network Algorithms," The Computer Science ad Engineering Handbook, Tucker, Jr. (ed.), pp. 203-225, 1997.

Manohararajah, "Parallel Alpha-Beta Search on Shared Memory Multiprocessors," pp. 1-92, Apr. 24, 2002.

McEneaney, "Visualizing and Assessing Navigation in Hypertext," ACM Proceedings of the Tenth ACM Conference on Hypertext and Hypermedia: Returning to our Diverse Roots, pp. 61-70, 1999.

Samet, The Design and Analysis of Spatial Data Structures, Addison-Wesley, Reading, MA, pp. 240-257, 1990.

"splay tree," http://searchdatabase.techtarget.com/sDefinition/0,,sid13_gci511191,00.html, pp. 1-3, Feb. 12, 2002.

Tamassia et al., "Data Structures," The Computer Science and Engineering Handbook, Tucker, Jr. (ed.), pp. 86-110, 1997.

Turbak, "Slivers: computational Modularity via Synchronized Lazy Aggregates," http://nike.wellesley.edu/~fturbak/pubs/phd/, pp. 1-2, Apr. 24, 2002.

"Viewlink Behaviors," http://msdn.microsoft.com/workshop/author/behaviors/overview/viewlink_ovw_entry.asp, pp. 1, Dec. 17, 2002.

Yao, "Tree Structures Construction Using Key Densities," ACM Proceedings of the 1975 Annual Conference, pp. 337-342, 1975.

"Microsoft Brandishes its Trident," http://news.com.com/2100-1001-239879.html?tag=mainstry, pp. 1-2, Oct. 21, 1996.

"W3C, Xforms 1.0, W3C Working Draft," http://www.w2.org/TR/2002/WD-xforms-20020118, pp. 1-97, Jan. 18, 2002.

"What is XUL?" Chapter 1, pp. 1-18, Jul. 10, 2001.

"XBL-XML Binding Language," http://www.w3.org/TR/xbl/, Hyatt (ed.), pp. 1-35, Feb. 23, 2001.

"Xforms—The Next Generation of Web Forms," http://www.w3.org/MarkUp/Forms/, pp. 1-6, 2001.

* cited by examiner

INTEGRATED CIRCUIT DEVICE CORE POWER DOWN INDEPENDENT OF PERIPHERAL DEVICE OPERATION

FIELD OF THE INVENTION

The present invention is generally related to digital computer systems.

BACKGROUND OF THE INVENTION

One of the important features of integrated circuits deigned for portable applications is their ability to efficiently utilize the limited capacity of the battery power source. Typical applications include cellular telephones and personal digital assistants (PDAs), which might have a Lithium ion battery or two AAA alkaline batteries as the power source. Users have come to expect as much as three to four weeks of standby operation using these devices. Standby operation refers to the situation where the cellular phone, handheld device, etc. is powered on but not being actively used (e.g., actively involved in a call). Generally, is estimated that that the integrated circuits providing the functionality of the device is only performing useful work approximately 2% of the time while the device is in standby mode.

Removing the power supply from selected circuits of a device during standby is a technique employed by designers for battery powered applications. The technique is generally applied only to circuit blocks outside of the central processing unit (CPU). A primary reason for not applying this technique to CPUs, has been the difficulty in being able to retain the current processor state information necessary to continue execution after coming out of the standby mode. One solution for this limitation involves saving the current processor state information to external storage mechanisms (e.g., such as flash memory, a hard disk drive, etc.). In such a case there is the overhead required in transferring the state to and from the external storage mechanism. Even if the battery powered device had a hard disk drive, and many don't, the time consuming state transfer would not meet the real time response requirements of the application when the device needs to wake up to respond to a new event.

Other issues are presented when the functionality of a device is implemented by a system-on-a-chip (SOC) integrated circuit. For example, when the core of a system-on-a-chip CPU is temporarily powered down (e.g., deep sleep mode), some of the outputs that connect to assorted peripherals (e.g. LCD display, SPI interface, SDIO, Hard-disk, etc.) should be held in an idle state to avoid having to reprogram the peripheral or lose existing context in the peripheral. This causes a problem since some peripherals need particular values to be set at their inputs (which are connected to the outputs of the SOC) to hold a safely inactive state. For example, if a device is connected to a SOC that is clocked on the falling edge of a clock signal, and the SOC is powered down with that signal as a logic 1, but the power down state is a logic 0 (e.g., ground), it will cause a spurious clock on that signal.

This problem is further exacerbated by the heavy use of pin-muxing or sharing, in which a single pin can have multiple functions in different designs by different customers. In one design a pin may be set to act as part of an SPI interface that wants to be held low when in sleep mode, while the same pin in another design, perhaps by a different customer may be used as a UART pin which would need to be held high when the CPU is put to deep sleep mode. While pin-muxing provides a way to put more features in each chip and allows the chip to be more suitable for a wide range of designs, it precludes knowing exactly at IC design time what each pin will be used for. A more flexible method of configuring the power down states is needed.

One solution to this problem would be to have a software defined register for each pin that drives the pin to any one of the allowed number of states, such as: Input, output 0, output 1, output Hi-Z, open drain, etc. This is a workable solution, but has a problem that since normally the signals that control these functions come from the core of the CPU, they will not be present when the core is powered down in deep sleep mode. To overcome this, a second set of registers on the SOC will have to be in the special power domain.

The special power domain is configured to always have power on (AO), even in the deep sleep mode. The special power domain allows the state information of these IO pads to be preserved. However the big problem is that it requires multiple signals from the portion of the chip that is in the special power domain to each pad, this can cause traces to be required. For example, with 300 signal pads and 3 wires per pad, as many as 900 traces have to be routed on the integrated circuit die, which is a large number at the top level of an integrated circuit die layout. These pad control signals must also be powered by the AO rail, which complicates the distribution of this AO rail or the routing of these pad control signals. Standard interrupt mechanism from the peripheral should result in an answer from the processor whatever is it's current state (e.g., active or standby). The benefits of a low power strategy cannot be fully realized if this mechanism is not transparent to the external environment.

Thus, what is needed is a solution for powering down a CPU for reduced standby power consumption while retaining the integrity of the operating state. What is further needed is a solution for powering down the CPU without imposing burdensome trace routing requirements on the integrated circuit die layout.

SUMMARY OF THE INVENTION

Embodiments of the present invention provides a method and system for powering down an integrated circuit device for reduced standby power consumption while retaining the integrity of the operating state. Embodiments of the present invention further provide a solution for powering down the integrated circuit device without imposing burdensome trace watering requirements on the integrated circuit die layout.

In one embodiment, the present invention is implemented as a circuit for maintaining asserted values on an input output pin (e.g., pad, etc.) of an integrated circuit device when one or more functional blocks of the device are placed in a sleep mode. The circuit includes an interface for coupling a functional block of a processor to an input and output pin and an output storage element coupled to the interface for storing a current value (e.g., logical one, logical zero, etc.) of the input output pin. The circuit further includes a sleep mode enable for controlling the output storage element to store the current value of the input output pin. The current value (e.g., as generated by the functional block) is stored prior to the functional block entering a sleep mode. The output storage element causes the current value of the input output pin to remain asserted after the functional block is in sleep mode. The sleep mode enable is also configured to deactivate the storage element when the sleep mode is exited, thereby allowing the input output pin to resume being driven by the awakened functional block. In one embodiment, the deactivation is performed independently among the different functional blocks. The integrated circuit device can be a CPU (central processor unit), a system-on-a-chip, and embedded computer system, or the like. The input output pin can be coupled to a peripheral device (e.g., display screen, USB interface, etc.) for providing functionality to a user.

In this manner, the signal state of the input output pins can be maintained as one or more functional blocks of the integrated circuit device are powered down. Upon exit from sleep mode (e.g., wake up), the input output pins can resume being driven by the one or more functional blocks. Additionally, this capability is provided without requiring the routing of multiple signals from a special power domain to the input output pin, which greatly reduces signal trace routing requirements. For example, embodiments of the present invention enabled a wake-up when one of a designated set of inputs transitions state. This allows the integrated circuit device to use the same pins that are used to recognize events during normal operation as wake pins to transition the device out of deep sleep.

In one embodiment, different voltage rails are provided to accommodate the different peripheral voltages. For example, a camera can work at one voltage while a WiFi chipset within the camera is working at another voltage. Waking-up from the standard signal of a peripheral (e.g., such as an interrupt) avoids creating additional pads just for this function, which would require a specific voltage choice and voltage translators on the board. So some few selected pads are used as a generic input in the processor active mode but as a wake-up in the processor standby mode, thus at the correct voltage.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
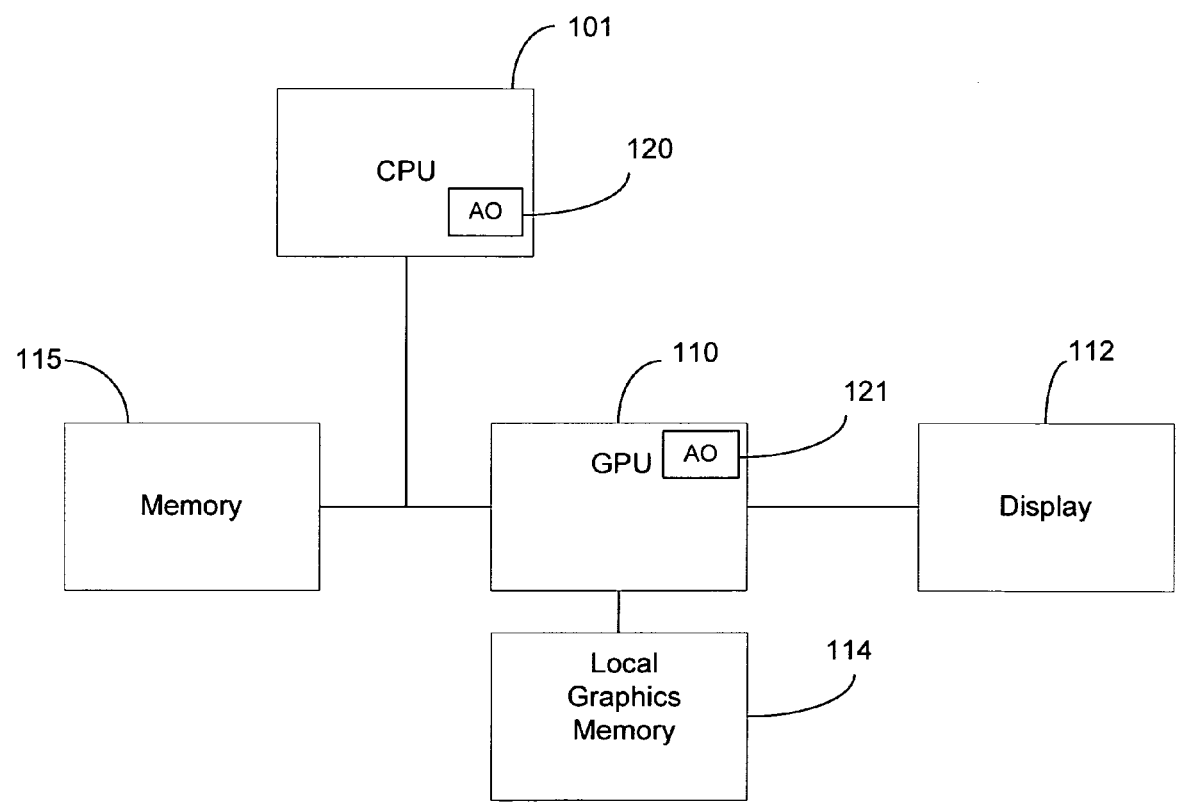
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115. A graphics processor unit (GPU) 110 can optionally be included, or any number of special function units. As shown in FIG. 1, the CPU 101 includes a special "always on" power domain 120 for managing the entry and exit of the computer system 100 into and out of a sleep mode. Similarly, the GPU 110 can also include an always on power domain 121. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112.

System 100 can be implemented as a programmable system-on-a-chip integrated circuit device, where for example, the CPU 101, memory 115, and GPU 110 are fabricated as a single integrated circuit die, with the display 112 being coupled as a peripheral device. Similarly, the system 100 can be implemented as an embedded computer system within, for example, a handheld device (e.g., PDA, cell phone, etc.). Alternatively, system 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented a set-top video game console device such as, for example, the Xbox®, available from Microsoft Corporation of Redmond, Wash., or the PlayStation3®, available from Sony Computer Entertainment Corporation of Tokyo, Japan.

Embodiments of the Invention:

Embodiments of the present invention implement a method and system for powering down an integrated circuit device for reduced standby power consumption while retaining the integrity of the operating state. Embodiments of the present invention enable the reliable powering down and waking up of the integrated circuit device without imposing burdensome trace routing requirements on the integrated circuit die layout.

Figure 2:
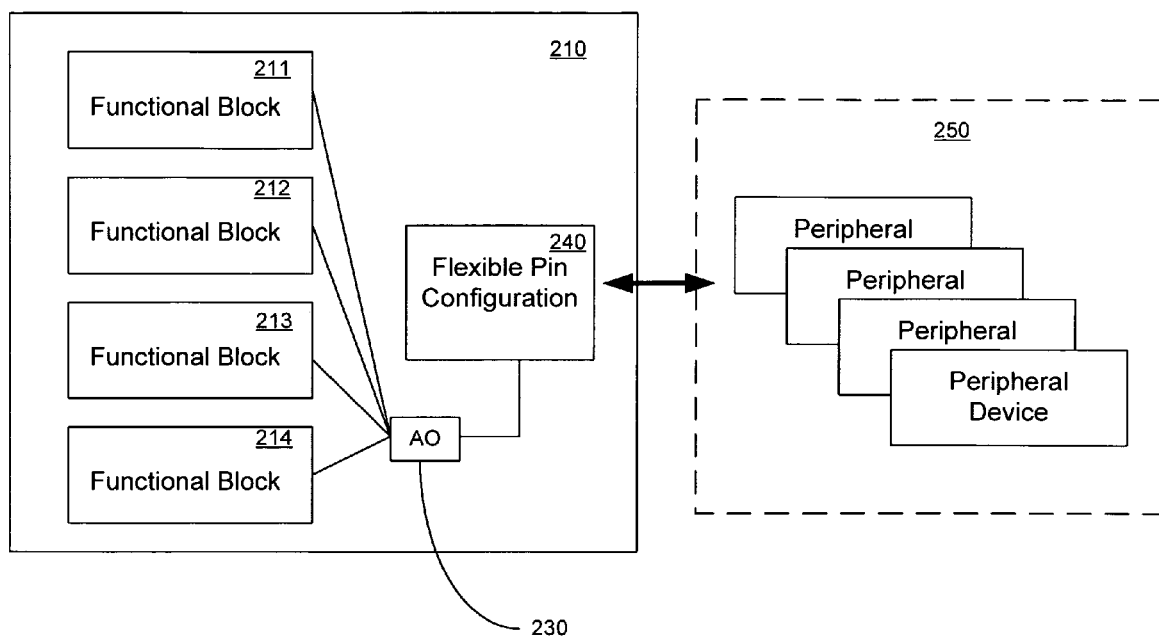
FIG. 2 shows an overview diagram of a flexible pin configuration system in accordance with one embodiment of the present invention.

FIG. 2 shows an overview diagram of a flexible pin configuration system 200 in accordance with one embodiment of the present invention. As depicted in FIG. 2, system 200 includes a processor 210 including a plurality of functional blocks 211-214. These functional blocks are each communicatively coupled to an always on power domain 230. System 200 also includes a flexible pin configuration component 240 that is configured to dynamically manage the connectivity of one or more input output pins to communicatively connect the functional blocks 211-214 to the multiple peripheral devices 250.

In the FIG. 2 embodiment, the flexible pin configuration component 240 is the interface that enables the multiple functions provided and implemented by the multiple functional blocks 211-214 to share a limited number of input output pins. For example, in one embodiment, via the interface provided by the flexible pin configuration component 240, the multiple functional blocks 211-214 can share a single input output pin to deliver their functionality to the peripheral devices 250, which may themselves also be sharing the single input output pin.

It should be noted that processor 210 can be used to implement a central processor unit, such as, for example, CPU 101 of FIG. 1, or a GPU such as the GPU 110 of FIG. 1. The processor 210 can also be part of a programmable system-on-a-chip device. Similarly, the processor 210 can be used to implement an integrated circuit device where the functions of a CPU and the functions of a GPU are combined.

The power domain 230 provides a mechanism for waking up the processor 210 from a sleep mode. For example, in one embodiment, the power domain 230 is configured to consistently have power applied to its constituent circuits. For example, the constituent circuits of the power domain 230 can be configured to receive a clock signal in an uninterrupted manner so that it can execute sequential state machine logic, instructions, etc. while the rest of the processor 210 is powered down. This can allow, for example, an internal state machine within the power domain 230 to detect wake event signals, the signals indicating a wake up from the sleep mode. For example, in one embodiment, the wake event signals are detected by the AO block (e.g., AO functional block 230). This block is on the AO rail. The one or more of the functional blocks 211-214 that normally process the events are powered down. Once power is returned, the functional blocks 211-214 can process the event, and resume normal operation.

In accordance with embodiments of the present invention, the one or more input output pins between the flexible pin configuration component 240 and the peripheral devices 250 will have their state reliably maintained even though the functional blocks of the processor 210 are powered down. The state will be maintained such that the entry and exit from sleep mode will be completely transparent to the peripheral devices 250.

In one embodiment, different voltage rails are provided to accommodate the different peripheral voltages. For example, a camera can work at one voltage while a WiFi chipset within the camera is working at another voltage. Waking-up from the standard signal of a peripheral (e.g., such as an interrupt) avoids creating additional pads just for this function, which would require a specific voltage choice and voltage translators on the board. So some few selected pads are used as a generic input in the processor active mode but as a wake-up in the processor standby mode, thus at the correct voltage. While some parts of the processor are powered off in standby, the system should be able to power them up again automatically after detecting a wake-up event. In one embodiment, this is done by a hardware control circuit on the AO voltage rail (e.g., AO functional block 230).

Figure 3:
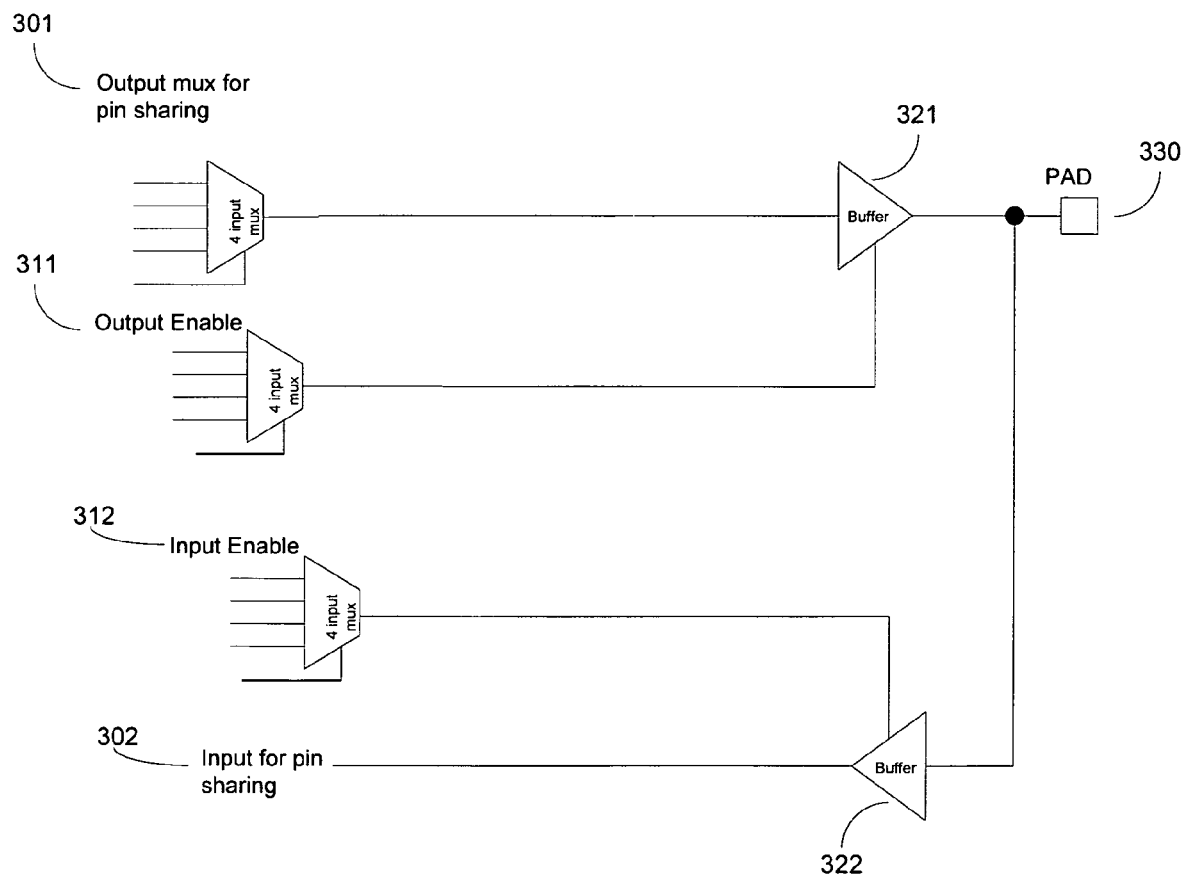
FIG. 3 shows a circuit diagram of a flexible pin configuration component in accordance with one embodiment of the present invention.

FIG. 3 shows a circuit diagram 300 of a flexible pin configuration component in accordance with one embodiment of the present invention. As depicted in the diagram 300 embodiment, the pin configuration component includes an output multiplexer for pin sharing 301, an output enable multiplexer 311, an input enable multiplexer 312, and an input signal line for pin sharing 302. The multiplexer 301 is coupled a common input output pin (e.g., pad 330) via an output buffer 321. The input buffer 322 drives the input 302 for pin sharing (e.g., shared by multiple functional blocks). The multiplexers 301, 311, and 312 allow multiple functional blocks of a processor (e.g., functional blocks 211-214 of FIG. 2) to selectively control the input output pin 330. For example, the multiplexers 301, 311, and 312 can allow the flexible pin configuration component to dynamically change control of the input output pin 330 between any of a number of different multiple functional blocks. In one embodiment, the selective allocation of the input output pin 330 can be placed under software control, for example as in a case where a control utility or the like executes on the processor to allocate control of the input output pin 330. The control allocation can be implemented on an as needed basis depending upon whatever function the device might be performing.

Figure 4:
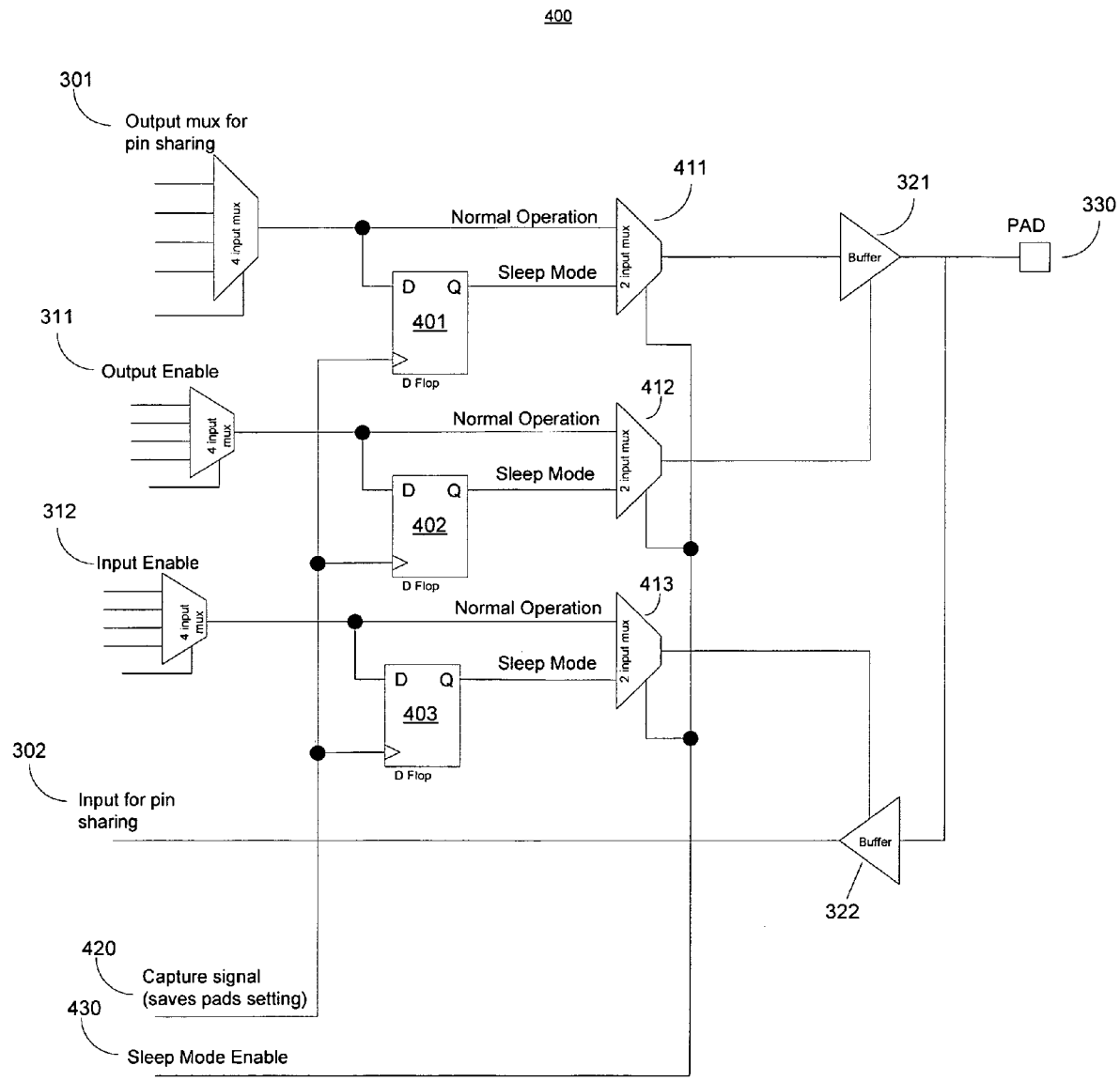
FIG. 4 shows a circuit diagram showing an input output capture component 400 in accordance with one embodiment of the present invention.

FIG. 4 shows a circuit diagram showing an input output capture component 400 in accordance with one embodiment of the present invention. The capture component 400 includes a flexible pin configuration component operating in conjunction with an output storage element and an input enable storage element in accordance with one embodiment of the present invention.

In normal operation, the selected function drives the output via the output multiplexer 301 as described above. The output of the multiplexer 301 is coupled to the input output pin 330 via a multiplexer 411 and the buffer 321 as shown. Similarly, in normal operation, the output enable 311 turns on the buffer 321 via the multiplexer 412 as shown. During sleep mode, a sleep mode enable 430 in conjunction with a capture signal 420 causes the storage element 401 and the storage element 402 to store the current value (e.g., logical one, logical zero, etc.) of the output multiplexer 301 and the current value of the output enable signal (e.g., the output enable multiplexer 311 as described above). This causes the input output pin 330 to be driven by the output of the storage element 401, which would be the previously stored current value from the multiplexer 301. Thus, after sleep mode entry, the functional blocks driving the inputs of the multiplexer 301 can be inactive. Additionally, in the FIG. 4 embodiment, the output enable signal itself can be inactive, since its value is stored within the storage element 402. Upon exit from sleep mode, the sleep mode enable 430 causes the input output pin 330 to resume being driven by the multiplexer 301, thereby deactivating the storage element 401 and 402.

With respect to the input enable 312, the input enable 312 has its current value saved by the storage element 403 in accordance with the capture signal 420 and the sleep mode enable 430. Thus, the input enable 312 can control the input buffer 322 even though the functional block that generates the input enable signal 312 is in sleep mode. The input 302 routes signals from the input output pin 330 to be shared by the appropriate functional blocks.

Thus, embodiments of the present invention limit the use of a central register to store state data for the input output pins of the device. Embodiment of the present invention utilize storage element as described above to enable each pad or input output pin to recall it's last state. For example, when the software executing on the chip wishes to put the chip in deep sleep mode, it simply cleanly tells each interface (e.g. UART, SPI, HDD, USB etc.) to enter it's inactive state (if it is not already there) and then asserts a HW signal (e.g., sleep mode enable) to each of the pads to capture their current value (e.g., input, output 0, output 1, hi-Z, open drain, etc.) and hold that value without the core of the chip being awake. Once this is done, the core can safely be powered down into a deep sleep mode. It should be noted that the constituent logic for performing the state retention function is comparatively small, and is located near each signal input output pin. Thus, very few top level signals are required to clock these storage elements, as these signals can be shared for all affected input-output pins, and don't need to be point to point routed from the always on the core (e.g., core 230 of FIG. 2), thereby minimizing trace routing requirements. The entry and exit for sleep mode is transparent to the peripheral devices. From an external devices' point of view, nothing has happened. The external devices' do not know the CPU has gone to deep sleep, as their inputs are not affected at all.

It should be noted that in one embodiment, the system 400 is configured such that the output enable 311 is not used to exit the sleep mode. In such a configuration, a separate control register can be utilized to disable the sleep mode on an interface by interface basis. The use of separate control registers to disable the sleep mode provides an advantage in that there can be less impact on signal timing.

Figure 5:
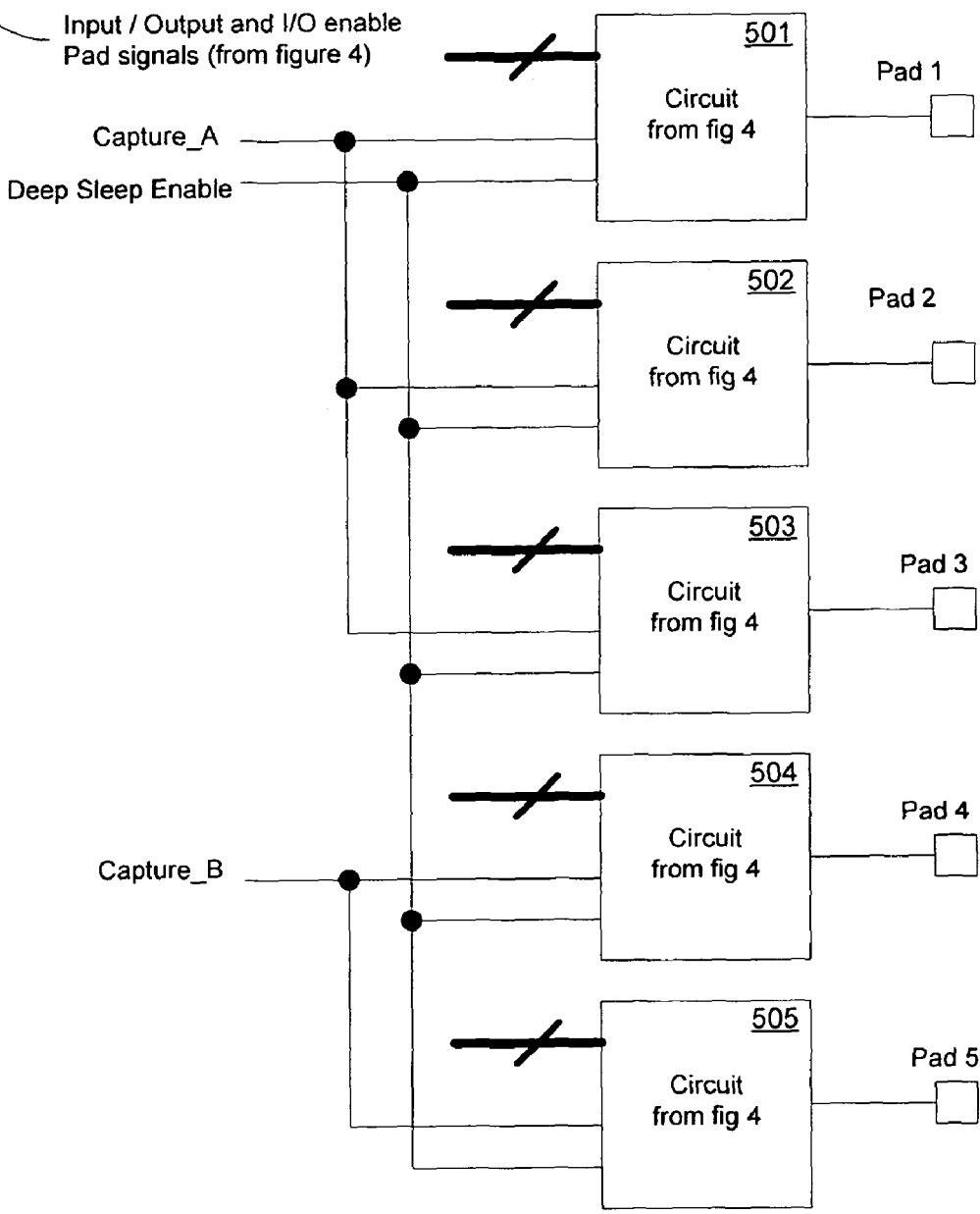
FIG. 5 shows a circuit diagram showing an implementation where multiple capture components are utilized to capture a variety of different input output signals for an integrated circuit device in accordance with one embodiment of the present invention.

FIG. 5 shows a circuit diagram 500 showing an implementation where multiple capture components 501-505 are utilized to capture a variety of different input output signals for an integrated circuit device in accordance with one embodiment of the present invention.

The FIG. 5 embodiment shows a case where multiple capture components 501-505 are used to capture signals around the integrated circuit device for different selected interfaces. This enables an application where the integrated circuit device can "unlock" just a single selected interface, or group of interfaces. be useful in applications such as where only the LCD needs to wake up to update the time on the display without needing to wake up all other interfaces. This aspect is illustrated in FIG. 3 where the capture components 501-503 are part of a first interface, Capture_A, and the Components 504-505 are part of a second interface, Capture_B. FIG. 5 also shows how to connect multiple pads with this feature to avoid routing a large number of signals around the integrated circuit die, with the input/output and I/O enable signals 520 for each to component 501-505 being as illustrated in FIG. 4.

In one embodiment, the de-assertion to re-assertion of the output enable signal for each capture component would switch each output from driving the latched idle state to the value driven from the core once software had reinitialized the peripheral controller to match the idle state. This is necessary for interfaces where the reset state of the controller may not match the idle sate.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In an integrated circuit device, a circuit for maintaining asserted values on an input output pin of the device when a functional block of the device is placed in a sleep mode, comprising:
   an interface for coupling a functional block of a processor to an input and output pin;
   an output storage element coupled to the interface for storing a current value of the input output pin;
   a sleep mode enable for controlling the output storage element to store the current value of the input output pin prior to the functional block being entering a sleep mode and cause the current value of the input output pin to remain asserted after the functional block is in sleep mode, and to deactivate the output storage element when the sleep mode is exited; and
   an input storage element coupled to the interface for preserving a state of an input enable signal for the input output pin when the sleep mode is entered.

2. The integrated circuit device of claim 1, wherein the interface further comprises a flexible pin configuration component for selectively coupling a plurality of functional blocks to the input output pin to enable the corresponding plurality of functions for the input output pin.

3. The integrated circuit device of claim 1, wherein the output storage element is configured to couple to the interface to store a selected current state for the plurality of functional blocks in accordance with the selective coupling of the pin configuration component.

4. The integrated circuit device of claim 1, further comprising:
   an input storage latch coupled to the interface for preserving a state of an input enable signal for the input output pin when the sleep mode is entered.

5. The integrated circuit device of claim 1, wherein the input output pin is coupled a peripheral device connected to the integrated circuit device.

6. The integrated circuit device of claim 1, wherein the integrated circuit device comprises a processor and the functional block comprises one of a plurality of functional blocks of the processor.

7. The integrated circuit device of claim 6, wherein the processor further comprises a programmable system-on-a-chip device.

8. The integrated circuit device of claim 1, wherein the current value of the input output pin remaining asserted after entry into the sleep mode causes the sleep mode to be transparent to the peripheral device.

9. A computer system that is configured to enter a sleep mode and exit the sleep mode, comprising:

a computer readable memory storing computer readable code;

a processor coupled to the computer readable memory and for executing a computer readable code, the processor including a plurality of functional blocks;

a peripheral device coupled to the processor and for providing functionality to a user;

an input output pin coupling the peripheral device to the processor;

a pin configuration component for selectively coupling the plurality of functional blocks to the input output pin to enable a corresponding plurality of functions for the input output pin;

an output storage element coupled to the pin configuration component for storing a current value of the input output pin; and a sleep mode enable for controlling the output storage element to store the current value of the input output pin prior to the plurality of functional blocks being placed into a sleep mode, causing the current value of the input output pin to remain asserted after entry into the sleep mode, and for deactivating the output storage element when exiting the sleep mode; and an input storage element coupled to the interface for preserving a state of an input enable signal for the input output pin when the sleep mode is entered.

10. The computer system of claim 9, wherein the output storage element is configured to couple to the interface to store a selected current state for the plurality of functional blocks in accordance with the selective coupling of the pin configuration component.

11. The computer system of claim 9, further comprising:
an input storage latch coupled to the pin configuration component for preserving a state of an input enable signal for the input output pin when the sleep mode is entered.

12. The computer system of claim 9, wherein the processor and the computer readable memory further comprise a programmable system-on-a-chip.

13. The computer system of claim 9, wherein the current value of the input output pin remaining asserted after entry into the sleep mode causes the sleep mode to be transparent to the peripheral device.

14. The computer system of claim 9, wherein the computer system comprises an embedded computer system of a handheld device.

15. A method for maintaining asserted values on an input output pin of an integrated circuit device when a functional block of the device is placed in a sleep mode, comprising:
receiving a current value from a functional block and coupling the current value to an input output pin by using an interface;

receiving a capture signal causing the storing of the current value of the input output pin by using a storage element coupled to the input output pin, wherein the storing occurs prior to the functional block entering a sleep mode;

receiving a sleep mode enable signal;

responsive to the sleep mode enable signal, transmitting the current value from storage element to the input output pin, wherein the transmitting occurs subsequent to the functional block entering the sleep mode to maintain the current value on the input output pin while the functional block is in the sleep mode; and an input storage element coupled to the interface for preserving a state of an input enable signal for the input output pin when the sleep mode is entered.

16. The method of claim 15, wherein the interface further comprises a flexible pin configuration component for selectively coupling a plurality of functional blocks to the input output pin to enable the corresponding plurality of functions for the input output pin.

17. The method of claim 15, wherein the output storage element is configured to couple to the interface to store a selected current state for the plurality of functional blocks in accordance with the selective coupling of the pin configuration component.

18. The integrated circuit device of claim 15, wherein the integrated circuit device comprises a processor and the functional block comprises one of a plurality of functional blocks of the processor.

* * * * *